United States Patent [19]
Grossman

[11] 3,865,490
[45] Feb. 11, 1975

[54] FILTER SPECTROGRAPH

[75] Inventor: Jack J. Grossman, Manhattan Beach, Calif.

[73] Assignee: McDonnell Douglas Corporation, Santa Monica, Calif.

[22] Filed: Aug. 29, 1973

[21] Appl. No.: 392,644

[52] U.S. Cl. .................... 356/76, 350/293, 356/79, 356/101
[51] Int. Cl. .......................... G01j 3/18, G01j 3/40
[58] Field of Search ............ 356/75, 79, 96, 97, 98, 356/76, 100, 101; 350/162 R, 293

[56] References Cited
UNITED STATES PATENTS

| | | | |
|---|---|---|---|
| 3,052,154 | 9/1962 | Bolz | 356/96 |
| 3,549,258 | 12/1970 | Henderson | 356/100 |
| 3,586,442 | 6/1971 | Tripp | 356/99 |
| 3,594,084 | 7/1971 | Turner | 356/100 |

*Primary Examiner*—Ronald L. Wibert
*Assistant Examiner*—F. L. Evans
*Attorney, Agent, or Firm*—D. N. Jeu; Walter J. Jason; Donald L. Royer

[57] ABSTRACT

A filter spectrograph unit for use in a micro-Raman spectrometer system or a remote sensing system is formed by combining an infinitely variable spectral line rejection filter (having appropriate entrance optics) functionally and operatively with a dispersing spectrograph. The line rejection filter is a modified form of a zero-dispersion double monochromator having an input light signal including laser light scattered from, for examle, minute Raman-active particles. The modified double monochromator includes an acylindrical mirror positioned so that the laser line will exit through an aperture in the mirror and all other spectral lines will be reflected and reformed by the modified double monochromator into an output light signal containing all of the original spectral information, less the rejected laser line. The dispersing spectrograph is integrally coupled to the modified double monochromator and produces from the output light signal a display of the entire Raman spectrum suitable for parallel readout and rapid data analysis.

11 Claims, 12 Drawing Figures

PATENTED FEB 1 1 1975 3,865,490

PATENTED FEB 11 1975

FILTER SPECTROGRAPH

BACKGROUND OF THE INVENTION

My present invention pertains generally to the field of Raman spectroscopy. More particularly, the invention relates to a novel filter spectrography having a high order to laser light rejection and providing a Raman spectrum display suitable of rapid analysis.

Basically, the Raman effect is an inelastic scattering process. If monochromatic light (such as from a well filtered laser beam) impinges on any material, the resultant signal can consist of elastically scattered incident light (Raleigh or Mie scattering), fluorescence (from inelastic absorption), and Raman lines whose frequency shift from the incident light is characteristic of the material. These frequency shifts correspond to the vibrational and rotational frequencies of the molecules and ions constituting the material. Since no two molecules have exactly the same vibrational frequencies, the Raman effect can be used as a "fingerprint" technique to identify molecular species.

It is well known that the chemical composition of gases, liquids and solids, the latter including relatively minute, Raman-active, single crystal particles, can be accurately determined from the spectra provided by a conventional Raman spectrometer system. In fact, measurements of Raman spectra of single crystal particles greater than 100 microns equivalent spherical diameter are presently being done routinely. One form of Raman spectrometer is, for example, shown, described and claimed in the U.S. Pat. No. 3,414,354 of Edouard H. Siegler, Jr. for Raman Spectrometers patented Dec. 3, 1968. There exists a need, however, to extend routine Raman analysis capabilities to turbid liquids and gases, and to particles from 5 microns to as small as 0.1 micron in size. Particles of interest include, for example, metal oxides, metal halides, heavy metal salts and hydrocarbon compounds from environmental sources.

A feasible micro-Raman spectrometer system, for example, for analyzing the very small single particles can consist of five subsystem elements including a focused laser source with controlled power density, a particle manipulator stage, a spectrographic light dispersing means for providing a Raman spectrum display, means for providing a parallel readout of the spectrum, and data reduction means for particle identification. In order to obtain a practical and useful micro-Raman spectrometer system, however, it was found that the spectral dispersing means must provide a laser line (Mie scattered light) rejection greater than $10^{11}$. This is ten times the smallest value of the Mie scattered laser signal to the strongest Raman signals and is necessary under certain predetermined system operating conditions to observe a Raman spectrum. Further, the total analysis time per particle must not exceed one hour in a suitable system. These requirements, among others, cannot be met with the conventional and commerically available rejection filters such as the Fabry-Perot interferometer and classical double monochromator.

SUMMARY OF THE INVENTION

Briefly, and in general terms, my invention is preferably accomplished by providing a filter spectrograph comprising an infinitely variable laser line rejection filter functionally and operatively combined with a dispersing spectrograph into a unit having a Mie scattered light (laser line) rejection of at least $10^{12}$ and providing a display of the entire Raman spectrum suitable for a parallel readout. The filter spectrograph unit includes a modified form of a zero-dispersion double monochromator and a dispersing spectrography integrally coupled therewith.

The modified double monochromator has a novel acylindrical mirror placed so that an aperture (slit) in the mirror is at the focal point of an upper monochromator (of the Czerny-Turner type, for example) and the laser line is set on this aperture by rotating the dispersing grating to the proper angle. The laser line will exit through the aperture of the acylindrical mirror and all other spectral lines will be reflected back through a lower monochromator (also of the Czerny-Turner type, for example) normally identical to the upper one, reforming into a point (circular) or line (rectangular) light source containing all of the original spectral information, less the rejected laser light. A point or line light source is, of course, produced according to whether the entrance aperture of the upper monochromator is circular or rectangular.

The light bundles entering through the upper monochromator are reflected by the acylindrical mirror into the similar lower monochromator and reformed at its exit aperture. By symmetry, the spatial relationship between the exiting light bundle and the incident light bundle is independent of grating orientation. Therefore, this system provides an infinitely variable laser line rejection capability by rotating the grating. It is also possible to eliminate more than one line at a time with multiple apertures suitably provided in the acylindrical mirror.

The dispersing spectrograph is integrally coupled to the lower monochromator such that the exit aperture of the latter serves as the entrance aperture of the former. Thus, the dispersing spectrograph produces from the point or line light source formed at the exit aperture of the lower monochromator, a Raman spectrum display suitable for parallel readout and rapid analysis.

BRIEF DESCRIPTION OF THE DRAWINGS

My invention will be more fully understood, and other advantages and features thereof will become apparent, from the following description of certain exemplary embodiments of the invention. The description is to be taken in conjunction with the accompanying drawings, in which.

DESCRIPTION OF THE PRESENT EMBODIMENTS

In the following description and accompanying drawings of certain illustrative embodiments of my invention, some specific values and types of materials are disclosed. It is to be understood, of course, that such values and types of materials are given as examples only and are not intended to limit the scope of this invention in any manner.

Figure 1:
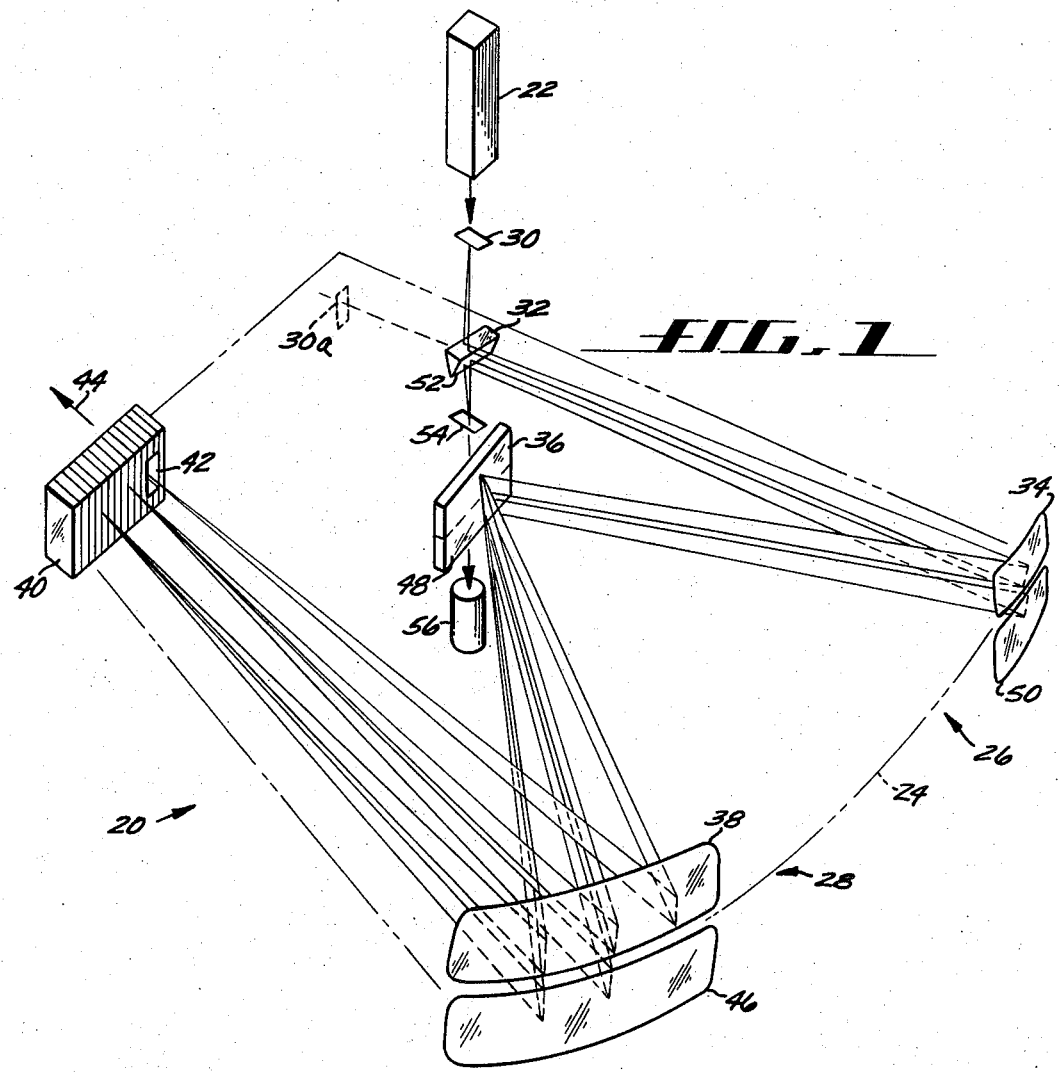
FIG. 1 is a perspective view, shown somewhat diagrammatically and in simplified form, of the spectral line rejection filter of a filter spectrograph unit according to my invention.

FIG. 1 is a perspective view, shown somewhat diagrammatically and in simplified form, of an illustrative laser (spectral) line rejection filter 20 constructed in accordance with the principles of this invention. A conventional laser source with controlled power density for properly activating a Raman-active particles and a conventional particle manipulator stage for appropriately mounting and positioning the particle, together with their associated and conventional optical elements, filters, and polarization analyzers and the like, can be represented by block 22 which provides a suitable input signal to the line rejection filter 20. The line rejection filter 20 in this instance has a plane of symmetry 24 so that the normally upper and lower filter sections 26 and 28 are physically mirror images.

The input signal to the line rejection filter 20 from the representative block 22 is focused on entrance aperture 30, and the light beam diverging from the entrance aperture is reflected by plane mirror 32 to collimating mirror 34 in the upper filter section 26. The mirror 32 can, of course, be omitted by locating the entrance aperture 30 at its virtual aperture 30a position and aligning the block 22 therewith. The concave collimating mirror 34 directs parallel light onto diffraction grating 36 which disperses the polychromatic beam into a spectrum with a set of spectral lines having angles relative to the parallel light depending on wavelength. Concave mirror 38 converges the dispersed light onto an acylindrical mirror 40 having an aperture 42 suitably positioned therein. The laser line, for example, can be brought to focus on (aligned with) the aperture 42 by rotating the grating 36 on its (central vertical) axis. In this condition, the laser line leaves the system through the aperture 42 as indicated by arrow 44 and can be measured by a suitable detector (not shown in FIG. 1). With such a detector, it is apparent that the spectrum can be scanned by rotating the grating 36 and this system thus acts like a spectrometer or monochromator. The entrance aperture 30 is 200 microns wide and 0.5 cm long, and the mirror aperture 42 (front opening) is 500 microns wide and 0.75 cm long, for example.

The acylindrical mirror 40 has a radius of curvature such that the remaining spectral lines are reflected back into the lower filter section 28. The reflected rays are directed toward concave mirror 46 which collimates them onto diffraction grating 48. The grating 48 reflects the rays to concave mirror 50 which focuses them against plane mirror 52 to image at exit aperture 54 following reflection from the plane mirror. The exit aperture 54 is, for example, 200 microns wide and 0.5 cm long. Where the lower grating 48 has twice as many (vertical) lines per millimeter as the upper grating 36, the collimated polychromatic beam from the concave mirror 46 is reflected by the lower grating and after being focused by the concave mirror 50 and reflected by the plane mirror 52 is imaged at the exit aperture 54 as a spectrum with the similar dispersion as produced by the upper grating at the acylindrical mirror 40. The exit aperture 54 would, in this instance, be substantially widened to span the entire spectrum which can be recorded on a suitable detector subsystem 56.

The detector subsystem 56 can be represented by a photographic plate, photodiode array, or a versatile image intensifier, image storage and dissector combination. This subsystem combination 56 can incorporate a signal intensification tube, and a storage element for signal integration with a scanning electron beam for spectral signal readout. Subsystem combination 56 can include, for example, the RCA type C33085AP2 or C33085DP2 three stage image intensifier tube, and type C21095C image Isocon camera tube. While a parallel readout is provided by the photographic plate or photodiode array, the subsystem combination 56 also provides an effectively parallel readout because of its high electronic scanning speed. In addition, the unique low noise characteristics of the RCA tubes make them ideally suited for measuring the very small signals of the kind involved.

Where, however, the lower grating 48 has the same number of (vertical) lines per millimeter as the upper grating 36, the collimated polychromatic beam from the concave mirror 46 is reformed into a beam of parallel rays from the lower grating to image in the form of the entrance aperture 30 at exit aperture 54 after being focused by the concave mirror 50 and reflected by the plane mirror 52. The line rejection filter 20 shown in FIG. 1 has a high rejection for stray light; however, the light in the wings (the spread out lower sloping sides) of the laser line at the acylindrical (filter) mirror 40 will still contribute a residual intensity of laser light at the exit aperture 54.

Figure 2:
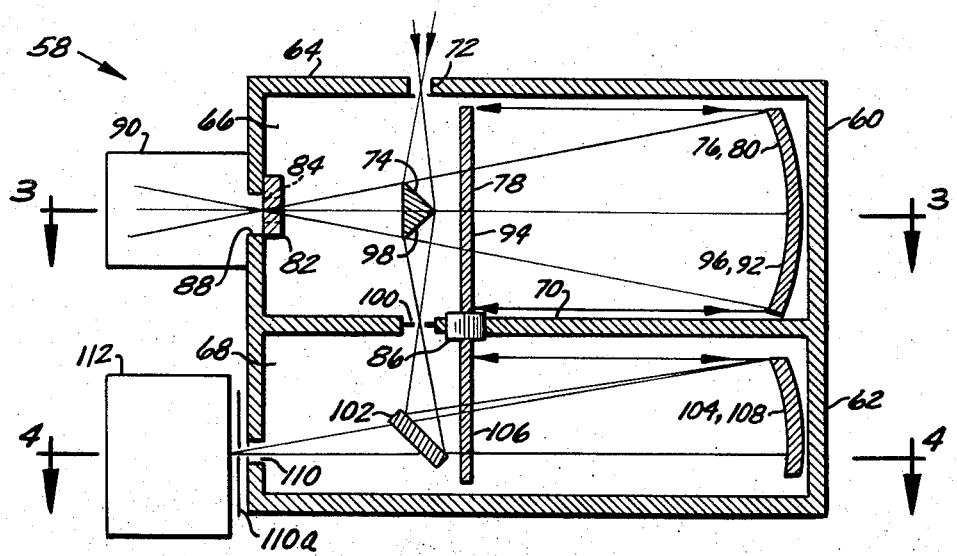
FIG. 2 is an elevational view, shown sectionally and in simplified form, of an illustrative filter spectrograph unit constructed in accordance with the invention.

FIG. 2 is an elevational view, shown sectionally through the various elements and in somewhat simplified form, of an illustrative (remote sensing) filter spectrograph unit 58. The unit 58 includes a line rejection filter 60 and a dispersing spectrograph 62 functionally and operatively combined therewith. The filter 60 can be similar to the line rejection filter 20 (FIG. 1) wherein the upper and lower gratings 36 and 48 are identical except that the entrance and exit (slit) apertures 30 and 54 are preferably (but not necessarily) reduced in height to provide point (approximately equal height and width or circular) apertures to match the field of view of a suitable telescope and reduce extraneous or superfluous light. The block 22, in this instance, can represent a suitably stopped Cassegrainian telescope imaging its field of view including a laser energized arc on the entrance aperture of the filter 60. All Raman spectral lines reflected by the acylindrical mirror in the filter 60 would, of course, be subsequently focused on its exit aperture. Using a point exit aperture, the laser line wing light distributed across the spectrum would be focused at points away from the central image. This leads to spectral purity since a high rejection for the laser line wing light is thus obtained and a chromatically pure Raman signal (which is laser light noise free) exits through the point exit aperture.

The unit 58 comprises, for example, a housing 64 including upper and lower compartments 66 and 68 separated by a common panel 70. The upper compartment 66 houses components of the rejection filter 60 and the lower compartment 68 houses components of the dispersing spectrograph 62. Conventional mounting means and light traps for the components (including a baffle separating the upper and lower halves of the filter 60 in compartment 66) have been omitted for clarity of illustration. Laser light is focused on entrance aperture 72 and reflected by plane mirror 74 to collimating mirror 76 which directs parallel light to diffraction grating 78. The diffraction grating 78 disperses the polychromatic beam into a spectrum with a set of spectral lines having angles relative to the parallel light depending on wavelength. The dispersed beam is focused by concave mirror 80 onto an acylindrical mirror 82 having an aperture 84 suitably positioned therein. The entrance aperture 72 can be, for example, 200 microns in diameter.

Figure 3:
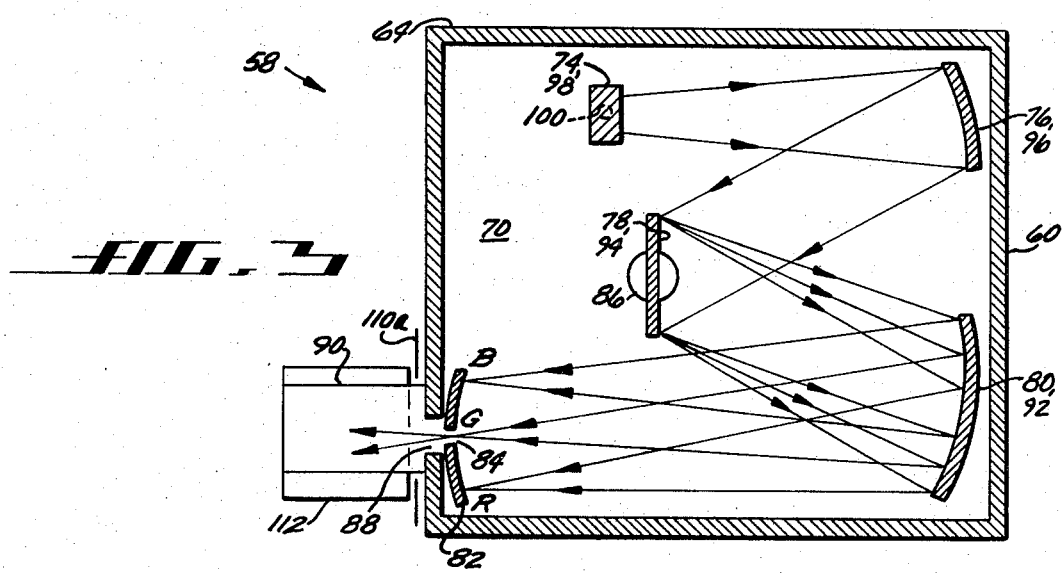
FIG. 3 is a plan view, shown in section and in simplified form, of the filter spectrograph unit as taken along the line 3—3 indicated in FIG. 2.

FIG. 3 is a plan view, shown in section and in simplified form, of the rejection filter 60 in the filter spectrograph unit 58 as taken along the line 3—3 indicated in FIG. 2. The concave mirror 80 and the aperture 84 in the acylindrical mirror 82 are more clearly shown in the FIG. 3. The laser line, for example, can be aligned with the aperture 84 by rotating the grating 78 on the axis of its central mounting base 86 rotatably supported in the panel 70. In this condition, the laser line leaves the system through the aperture 84 and wall opening 88 to detector 90 for measurement. With the detector 90, it is apparent that the spectrum can be scanned by rotating the grating 78 and this system thus acts like a spectrometer or monochromator.

The acylindrical mirror 82 has a radius of curvature such that the remaining spectral lines are reflected back to collimating concave mirror 92, diffraction grating 94, focusing concave mirror 96, lower plane mirror 98 and focusing at a point exit aperture 100. It can be seen that the reflected rays retrace their paths through the rejection filter 60 and out into the dispersing spectrograph 62. The exit aperture 100 is positioned in the panel 70 as shown in FIG. 2 and the diverging rays impinge on a plane mirror 102 in the compartment 68. The mirrors 76 and 96 can be a single mirror, the gratings 78 and 94 can be the same grating, and the mirrors 80 and 92 can be a single mirror as illustrated in FIGS. 2 and 3. The gratings 78 and 94 can, for example, be a 600 lines per millimeter grating blazed for the second order. The exit aperture 100 can be, for example, 200 microns in diameter.

Figure 4:
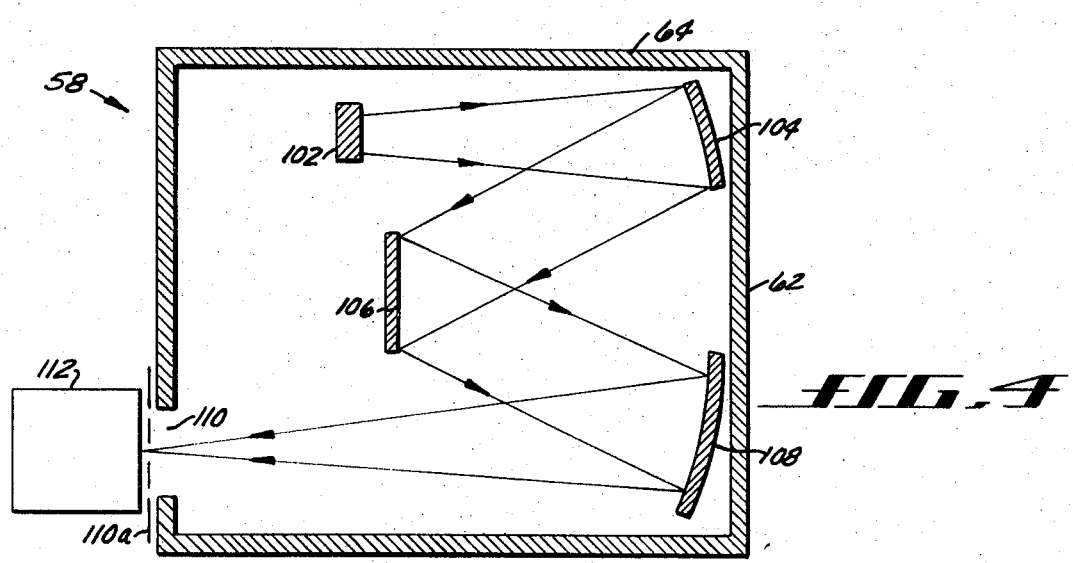
FIG. 4 is another plan view, shown in section and in simplified form, of the filter spectrograph unit as taken along the line 4—4 indicated in FIG. 2.

FIG. 4 is another plan view, shown in section and in simplified form, of the dispersing spectrograph 62 in the filter spectrograph unit 58 as taken along the line 3-3 indicated in FIG. 2. The plane mirror 102 in the compartment 68 reflects the rays diverging from the exit aperture 100 to a concave collimating mirror 104. The collimating mirror 104 directs parallel light onto diffraction grating 106 which disperses the polychromatic beam into a spectrum towards concave focusing mirror 108. The focusing mirror 108 focuses the spectrum at output slot 110 and through it onto detector subsystem 112. The slot 110 can be, for example, approximately 0.5 cm in height and 9.0 cm in width. The detector subsystem 112 can be identical to the detector subsystem 56 (FIG. 1) of the nature previously described. The grating 106 can be supported by the central mounting base 86 (FIG. 2) and can be a 600 lines per millimeter grating blazed for the second order, for example. Of course, the grating 106 can have a larger or smaller number of lines per millimeter according to the amount of dispersion desired or required.

In operation, with appropriate stray light shielding, the Mie to Raman scattering rejection ratio of the filter spectrograph unit 58 is $10^{12}$. The first grating 78 provides diffraction limited laser line rejection at any Raman frequency equal to $10^5$. The laser line itself is essentially removed completely through the aperture 84. The second pass focuses all Raman lines on the exit aperture 100. The diffraction of remanent (wing) laser light from any Raman line position (an element of about one entrance slit-width wide) will be imaged away from the exit aperture 100 and the diffraction limited contribution of this element at the exit aperture will be equivalent to another rejection factor of $10^5$. There are, however, approximately 1,000 of these elements in the spectral plane at the acylindrical mirror 82 and, therefore, the net rejection is reduced $10^{-3}$ times $10^5$ to only $10^2$. The third grating 106 then provides an additional rejection of $10^5$ and the total rejection at the spectral plane at slot 110 is $10^{12}$.

Figure 5:
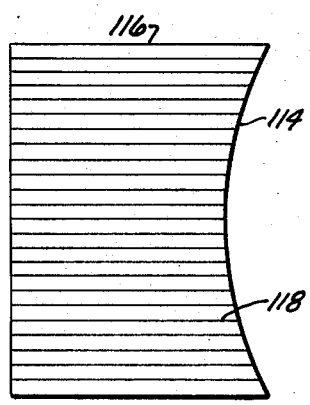
FIG. 5 is a plan view showing a construction step of the acylindrical mirror used in the line rejection filter of the filter spectrograph unit shown in FIGS. 2 and 3.
Figure 6:
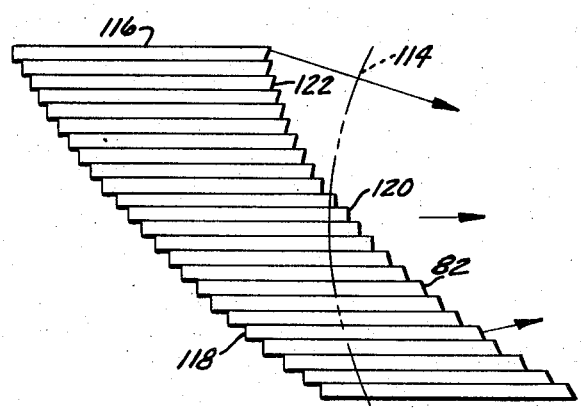
FIG. 6 is a plan view showing another construction step of the acylindrical mirror following the step shown in FIG. 5.

FIGS. 5 and 6 are plan views showing two construction steps of the acylindrical mirror 82 used in the rejection filter 60 of the filter spectrograph unit 58. All curves, dimensions and displacements shown in FIGS. 5 and 6 are grossly exaggerated for clarity of illustration. A first order system correction must be made because the spectral image plane of the rejection filter 60 (FIG. 3) does not coincide with a reflecting cylindrical circle. One way to correct for this was by grinding an acylindrical surface 114 in a stack 116 of parallel glass plates 118 as indicated in FIG. 5, and then sliding the glass plates into coincidence with the spectral image plane 120 as indicated in FIG. 6. This offset acylindrical mirror 82 thus has a properly oriented reflecting surface 122 and will reflect all light back into the lower half of the rejection filter 60. It may be noted that since every rejection filter has a unique image plane to reflecting surface relationship, each requires a unique offset acylindrical mirror design. Also, the success of aberration minimization for any particular design depends only on the ratio of the step height to width, which should be kept as small as possible.

Figure 7:
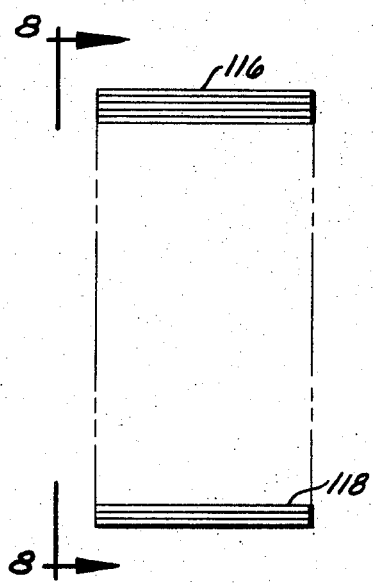
FIG. 7 is a front elevational view (rotated counter-clockwise 90°) of a stack of optical elements from which the acylindrical mirror can be fabricated.
Figure 8:
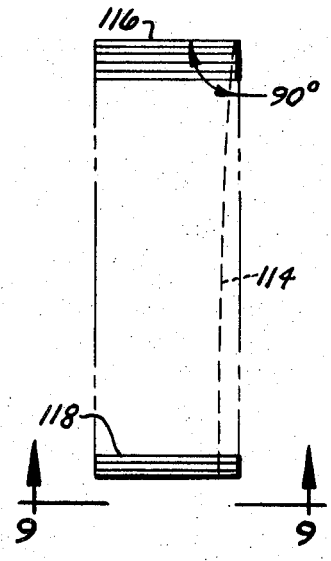
FIG. 8 is a top plan view of the stack of optical elements, with an aspheric cylinder surface indicated thereon, as taken along the line 8—8 shown in FIG. 7.
Figure 9:
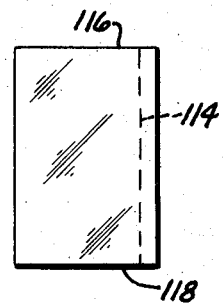
FIG. 9 is a side elevational view of the stack of optical elements, with the aspheric cylinder surface indicated thereon, as taken along the line 9—9 shown in FIG. 8.

FIGS. 7, 8 and 9 are front elevational (rotated counterclockwise 90°), top plan and side elevational views of the stack 116 of optical elements (glass plates) 118 from which the acylindrical mirror 82 can be fabricated. The stack 116 can, for example, be composed of 75 microscope slides which are each 3 inches long, 1 inch wide and 1 millimeter thick cemented together with a suitable thermoplastic cement such as shellac. An aspheric cylinder surface 114 is then generated according to the equation $z = ax^2 + bx^4 + cx^6 + dx^8$ where the aspheric constants a = 0.0196645, b = −0.000229621, c = 0.000000655404 and d = 0.00000000208780, and $5.5 \angle \times \angle 8.5$ are illustrative values suitable for a specifically used and tested upper half (3/4 meter spectrometer) construction of the rejection filter 60. Because of the rotation of the views, z is in the horizontal direction and x is in the vertical direction for the surface 114 indicated in FIG. 8.

Figure 10:
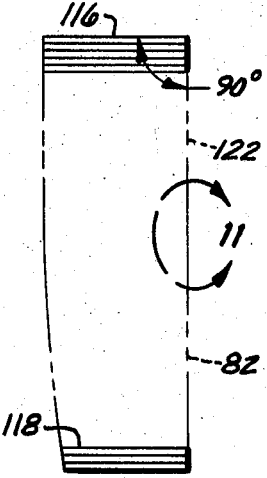
FIG. 10 is a top plan view, similar to that of FIG. 8, of the acylindrical mirror produced after adjustment of the optical elements to form an aspheric echelle cylinder surface therefrom.
Figure 11:
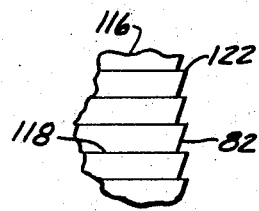
FIG. 11 is a fragmentary enlarged view of the aspheric echelle cylinder surface as taken along the line 11—11 shown in FIG. 10.

FIGS. 10 and 11 are top plan and fragmentary enlarged views respectively of the acylindrical mirror 82 produced after adjustment of the optical elements 118 and a portion of the aspheric echelle cylinder surface 122 resulting from such adjustment. After polishing of the generated cylinder surface 114 (FIG. 8), the cement is warmed to permit moving of the elements 118 to the right angle condition indicated in FIG. 10 and forming of the echelle cylinder surface 122. The calculated spectral image plane in this particular instance happened to be a substantially flat surface and not the ordinarily curved one. The elements 118 are moved to produce very small offsets of the order of 50 microns, for example, as illustrated in FIG. 11. After formation of the echelle cylinder surface 122, the surface can be coated with evaporated aluminum and overcoated with silicon oxide or silica.

Before coating and overcoating of the echelle cylinder surface 122, the aperture (or apertures) 84 in the acylindrical mirror 82 can be produced by temporarily removing one (or more) contiguous pair of the optical elements 118 from a selected position (or positions) and grinding and polishing the orginally contiguous surfaces so that the elements taper widthwise (laterally outward) from front to rear. Sufficient material is laterally ground away at the front of the pair of elements 118 to equal the desired aperture width. Corresponding (width-wise) wedge-shaped and (heightwise) tapering upper and lower spacers of a thickness (width) at front equal to the desired aperture width are suitably positioned between the pair of elements 118 to form the aperture 84 of desired height and width. The spacers are outwardly tapered heightwise from front to rear and the pair of elements 118 are similarly tapered widthwise to provide an aperture 84 which flares both heightwise and widthwise from front to rear at an angle according to the f-number of the focusing mirror 80.

Another method of producing the aperture 84 is to use an aperture-forming structure including wedge-shaped upper and lower spacer sections sandwiching a pyramid shaped (aperture-forming) section. From the front (apex) end, the pyramid section flares heightwsie and widthwise to the rear at the appropriate angle according to the f-number of the focusing mirror 80. The (plan view) apex angle of the pyramid section is, for example, 9° (4.5 degrees half angle). Optical elements 118 are stacked on both sides of the apex angle of the aperture-forming structure in a straight column, and the front and rear stepped ends (plan view) of the elements are ground straight. The result is a stack similar to the stack 116 (FIG. 8) except that the cross section of the elements 118 are now parallelograms (and not rectangles) stacked on both sides of the aperture-forming structure. The acylindrical surface 114 is ground in the stack 116 (including the aperture-forming structure) and the elements 118 are moved so that their front ends are placed in coincidence with the spectral image plane 120 as before. The pyramid section is removed to provide the aperture 84. Dimensions of the aperture 84 can, of course be varied by adjusting the position of the apex of the pyramid section with respect to the acylindrical surface 114 to be ground. Because of the very small distances that the elements 118 are moved, and the small half angle (of 4.5°) is less than 45°, the resultant echelle cylinder surface 122 is functionally and effectively accurate.

Figure 12:
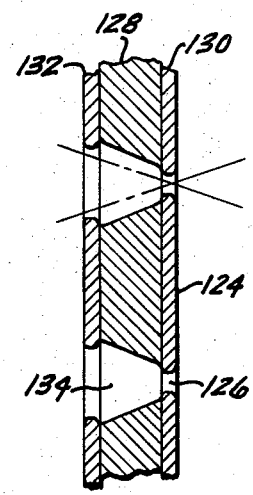
FIG. 12 is a fragmentary sectional view of a replica mirror produced from a negative of the aspheric echelle cylinder surface of the acylindrical mirror shown in FIG. 10 and having predetermined apertures provided therein to remove selected spectral lines of a spectrum displayed thereon.

FIG. 12 is a fragmentary sectional (plan) view of a replica mirror 124 derived from the aspheric echelle cylinder surface 122 of the acylindrical mirror 82 shown in FIG. 10. This replica morror 124 can have one or more apertures 126 provided therein to remove selected spectral lines of a spectrum focused thereon. The replica mirror 124 can be used in place of the acylindrical mirror 82 in the rejection filter 60 (FIG. 3), or a similar nonreflecting (suitably anodized or painted black) sheet structure with one or more apertures selectively provided therein can be used as a mask 110a if desired or required at the output slot 110 (FIG. 4) in the dispersing spectrograph 62 to pass selected spectral lines to the detector subsystem 112. The replica mirror 124 can have a copper core layer 128 (0.010 inch thick) and front and rear nickel cover layers 130 and 132 (each 0.0001 inch thick). This sandwich construction is preferably used because any buckling of the replica mirror 124 due to temperature changes or variations is prevented or minimized. To illustrate the apertures 126 and passageways 134 more clearly, the thicknesses of the layers 128, 130 and 132 have been relatively enlarged and the offsets therein omitted in FIG. 12.

To produce the replica mirror 124, for example, the following principal steps can be performed:

a. The acylindrical mirror 82 (FIG. 3) is removed from the rejection filter 60 and a photographic plate installed with suitable fiducial locating marks provided thereon.

b. The spectrum of some material such as pure silicon, for example, can be taken on the photographic plate and a conventional contrasting developing process is used to show all of the silicon spectral lines clearly after removal of the plate from the rejection filter 60.

c. Steps (a) and (b) are repeated with another photographic plate to obtain enlarged spectral lines thereon by opening up the entrance aperture 72 prior to exposure of this plate.

d. A negative (optically smooth plastic mold or the like) of the aspheric echelle cylinder surface 122 of the acylindrical mirror 82 is made and the nickel-copper-nickel layes 130, 128 and 132 of the replica mirror 124 are formed by deposition or plating in the mold followed by removal therefrom.

e. Photoresist is applied to the nickel layers 130 and 132 and the two photographic plates are used to expose the photoresist on these nickel layers and processed. The photographic plate with the enlarged spectral lines is used to expose the photoresist on the rear nickel layer 132 so that larger slit apertures or openings can be provided therein.

f. The front and rear nickel layers 130 and 132 are etched with a nickel etchant to produce the different size slit apertures or openings therein. The slit openings in the rear nickel layer 132 can be substantially larger than their corresponding ones in the front nickel layer 130.

g. Finally, the copper core layer 128 is etched with a copper etchant such as ferric chloride to produce tapering passageways 134 (FIG. 12) connecting the slit openings in the rear nickel layer 132 with those in the front nickel layer 130. Etching conventionally produces the heightwise and width-wise tapering passageways 134 as shown in FIG. 12.

While certain exemplary embodiments of this invention have been described above and shown in the accompanying drawings, it is to be understood that such embodiments are merely illustrative of, and not restrictive on, the broad invention and that I do not desire to be limited in my invention to the specific constructions or arrangements shown and described, for various obvious modifications may occur to persons having ordinary skill in the art.

I claim:

1. A filter spectrograph unit comprising:
a rejection filter including means for producing a first spectrum from input light entering an entrance aperture of said rejection filter, means for rejecting at least one selected spectral line of said first spectrum, and means for reforming the remaining spectral lines of said first spectrum into output light containing all of the original spectral information, less said at least one rejected spectral line, at an exit aperture of said rejection filter; and
a dispersing spectrograph including means for producing a second spectrum from input light entering an input aperture of said dispersing spectrograph, said second spectrum being formed at an output aperture of said dispersing spectrograph, and said dispersing spectrograph being coupled to said rejection filter whereby said output light of said rejection filter from said exit aperture thereof is directed into said input aperture of said dispersing spectrograph.

2. The invention as defined in claim 1 wherein said dispersing spectrograph is integrally coupled to said rejection filter whereby said exit aperture of said rejection filter also serves as said input aperture of said dispersing spectrograph.

3. The invention as defined in claim 1 wherein said rejecting means includes an acylindrical mirror having at least one rejection aperture therein and positioned so that said at least one selected spectral line will exit through said at least one rejection aperture in said mirror, and said remaining spectral lines will be reflected by said mirror and reformed by said reforming means into said output light at said exit aperture of said rejection filter.

4. The invention as defined in claim 1 wherein said input light entering said entrance aperture of said rejection filter includes laser light scattered from material under analysis, and said rejecting means is adapted to reject at least the laser spectral line from said first spectrum.

5. The invention as defined in claim 4 wherein said exit aperture of said rejection filter is a generally point aperture, and said remaining spectral lines of said first spectrum are reformed by said reforming means at said rejection filter exit aperture into a generally point light source.

6. The invention as defined in claim 5 wherein said rejecting means includes an acylindrical mirror having at least one rejection aperture therein and positioned so that at least said laser spectral line will exit through said at least one rejection aperture in said mirror, and said remaining spectral lines will be reflected by said mirror and reformed by said reforming means at said rejection filter exit aperture into said generally point light source.

7. The invention as defined in claim 1 further comprising mask means aligned with and positioned at said output aperture of said dispersing spectrograph, said mask means including at least one aperture therein to pass at least one selected spectral line of said second spectrum therethrough.

8. In a filter spectrograph unit, a spectral line rejection filter comprising:
means for producing a spectrum from input light entering an entrance aperture of said rejection filter;
means for rejecting at least one selected spectral line of said spectrum; and
means for reforming the remaining spectral lines of said spectrum into output light containing all of the original spectral information, less said at least one rejected spectral line, at an exit aperture of said rejection filter,
said rejecting means including a mirror means having at least one rejection aperture therein and positioned so that said at least one selected spectral line will exit through said at least one rejection aperture in said mirror means, and said remaining spectral lines will be reflected by said means and reformed by said reforming means into said output light at said exit aperture of said rejection filter.

9. The invention as defined in claim 8 wherein said input light entering said entrance aperture of said rejection filter includes laser light scattered from material under analysis, and said rejecting means is adapted to reject at least the laser spectral line from said spectrum.

10. In a filter spectrograph unit, a spectral line rejection filter comprising:
means for producing a spectrum from input light entering an entrance aperture of said rejection filter;
means for rejecting at least one selected spectral line of said spectrum; and
means for reforming the remaining spectral lines of said spectrum into output light containing all of the original spectral information, less said at least one rejected spectral line, at an exit aperture of said rejection filter,
said rejecting means including an acylindrical mirror having at least one rejection aperture therein and positioned so that said at least one selected spectral line will exit through said at least one rejection aperture in said mirror, and said remaining spectral lines will be reflected by said mirror and reformed by said reforming means into said output light at said exit aperture of said rejection filter.

11. In a filter spectrograph unit, a spectral line rejection filter comprising:
means for producing a spectrum from input light entering an entrance aperture of said rejection filter, said input light entering said entrance aperture of said rejection filter including laser light scattered from material under analysis;
means for rejecting at least one selected spectral line of said spectrum, said rejecting means being adapted to reject at least the laser spectral line from said spectrum; and means for reforming the remaining spectral lines of said spectrum into output light containing all of the original spectral information, less said at least one rejected spectral line, at an exit aperture of said rejection filter, said rejecting means including an acylindrical mirror having at least one rejection aperture therein and positioned so that at least said laser spectral line will exit through said at least one rejection aperture in said mirror, and said remaining spectral lines will be reflected by said mirror and reformed by said reforming means at said rejection filter exit aperture into a generally point light source.

* * * * *